United States Patent
Gerwatowski et al.

(10) Patent No.: US 9,604,598 B2
(45) Date of Patent: Mar. 28, 2017

(54) WIPER ARM PIN RELEASE FOR SERVICE

(71) Applicant: GM GLOBAL TECHNOLOGY OPERATIONS LLC, Detroit, MI (US)

(72) Inventors: Bradley T. Gerwatowski, New Hudson, MI (US); James P. Maluchnik, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/795,255

(22) Filed: Jul. 9, 2015

(65) Prior Publication Data

US 2017/0008494 A1    Jan. 12, 2017

(51) Int. Cl.
B60S 1/34    (2006.01)

(52) U.S. Cl.
CPC ............. *B60S 1/3459* (2013.01); *B60S 1/345* (2013.01); *B60S 1/349* (2013.01); *B60S 1/3443* (2013.01); *B60S 1/3456* (2013.01); *B60S 1/3497* (2013.01)

(58) Field of Classification Search
CPC .......... B60S 1/34; B60S 1/3413; B60S 1/345; B60S 1/3456

USPC ........................ 15/250.351, 250.352, 250.19
See application file for complete search history.

(56) References Cited

FOREIGN PATENT DOCUMENTS

| DE | 3809966 | * 10/1988 |
|----|---------|-----------|
| DE | 3741300 | * 6/1989 |
| EP | 0334755 | * 9/1989 |
| EP | 1514752 | * 3/2005 |
| FR | 1232079 | * 4/1960 |
| GB | 2238235 | * 8/1993 |
| JP | 60-206755 | * 10/1985 |
| KR | 10-0612179 | * 8/2006 |

* cited by examiner

*Primary Examiner* — Gary Graham
(74) *Attorney, Agent, or Firm* — Quinn Law Group, PLLC

(57) ABSTRACT

A wiper system wiper system for wiping a window is provided. The wiper system has an arm head and an arm retainer connected to the arm head via a pivot. The wiper system includes a latch for controlling pivoting of the arm retainer with respect to the arm head. The latch is configured to restrict pivoting of the arm retainer with respect to the arm head to an operating range close to the window when the latch is in a latched state. The latch is further configured to allow pivoting of the arm retainer with respect to the arm head from the operating range to a servicing position away from the window when the latch is in an unlatched state.

9 Claims, 2 Drawing Sheets

WIPER ARM PIN RELEASE FOR SERVICE

TECHNICAL FIELD

This disclosure relates to a wiper arm pin release for service.

BACKGROUND

A vehicle typically includes a rear window and may include a rear wiper system for removing water, snow, ice, dirt, and debris from the rear window. The rear wiper system may include a wiper blade assembly having a wiper blade. The wiper blade assembly may be connected to a wiper arm. The rear wiper system may occasionally require service. For example, the wiper blade may periodically need to be replaced.

It may be easier for a person to service the rear wiper system by allowing the wiper arm and blade to be pivoted to a service up position. However, the rear wiper system may be subjectable to external forces that could lift the wiper arm and the wiper blade assembly from the rear window when the rear wiper system is not being serviced. The external forces on the rear wiper system may result from, for example, an automatic car wash. If the wiper arm and wiper blade assembly are lifted from the window by external forces, the wiper arm and/or the wiper blade assembly could possibly be damaged. Thus, it may be beneficial to prevent the wiper arm and wiper blade assembly from being lifted from the window and pivoted toward the service up position by external forces, except for times when the rear wiper system is being serviced. This disclosure applies to any wiper system for any window or other surface in any machine or manufacture.

SUMMARY

A wiper system and a vehicle are provided herein. The wiper system is for wiping a window and has an arm head and an arm retainer connected to the arm head via a pivot. The wiper system includes a latch for controlling pivoting of the arm retainer with respect to the arm head. The latch is configured to restrict pivoting of the arm retainer with respect to the arm head to an operating range close to the window when the latch is in a latched state. The latch is further configured to allow pivoting of the arm retainer with respect to the arm head from the operating range to a servicing position away from the window when the latch is in an unlatched state.

The vehicle has a wiper system for wiping a window that includes an arm head, an arm retainer, a wiper blade, an arm biasing member, and a latch. The arm retainer is connected to the arm head via a pivot. The wiper blade is connected to the arm retainer. The arm biasing member is connected to the arm head and to the arm retainer and is for biasing the wiper blade toward the window. The latch is for controlling pivoting of the arm retainer with respect to the arm head. The latch is configured to restrict pivoting of the arm retainer with respect to the arm head to an operating range close to the window when the latch is in a latched state. The latch is further configured to allow pivoting of the arm retainer with respect to the arm head from the operating range to a servicing position away from the window when the latch is in an unlatched state.

The wiper system and the vehicle prevent the wiper arm and wiper blade assembly from being lifted from the window and pivoted toward the service up position by external forces, except for times when the wiper system is being serviced.

The above features and advantages and other features and advantages of the present teachings are readily apparent from the following detailed description of the best modes for carrying out the present teachings when taken in connection with the accompanying drawings.

DETAILED DESCRIPTION

Figure 1:
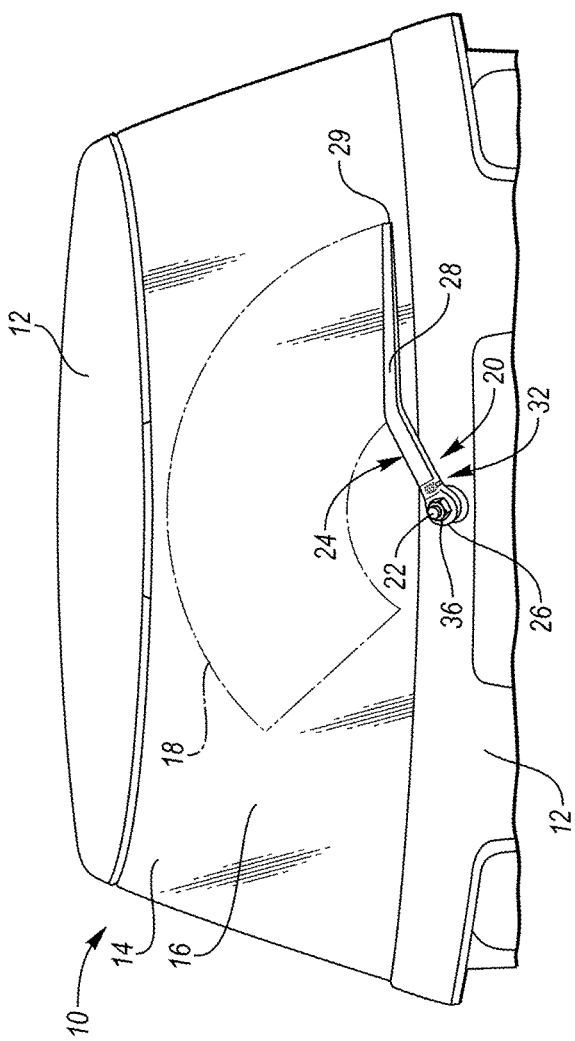
FIG. 1 is a fragmentary schematic illustration of a rear end of a vehicle having a wiper system that includes an arm head, an arm retainer connected to the arm head via a pivot, and a latch for controlling pivoting of the arm retainer with respect to the arm head.

Referring to the drawings, wherein like reference numbers refer to like components throughout the views, FIG. 1 shows the rear end of a vehicle 10 having a body 12 and a window 14 connected to the body 12. The window 14 may be fixed to the body 12 or may be openable, for example via a hinge mechanism, via a slide mechanism, or via any other suitable opening mechanism. The window 14 may be a rearward facing window, as shown, or the window 14 may be facing in any other direction relative to the direction of vehicle 10 travel. The window 14 has a window surface 16 on the exterior of the vehicle 10. The window 14 and the window surface 16 may be configured to have a compound curvature. The vehicle includes a wiper system 20 for wiping a wiped area 18 of the window surface 16 to remove water, snow, ice, dust, dirt, and debris from the wiped area 18.

Figure 2:
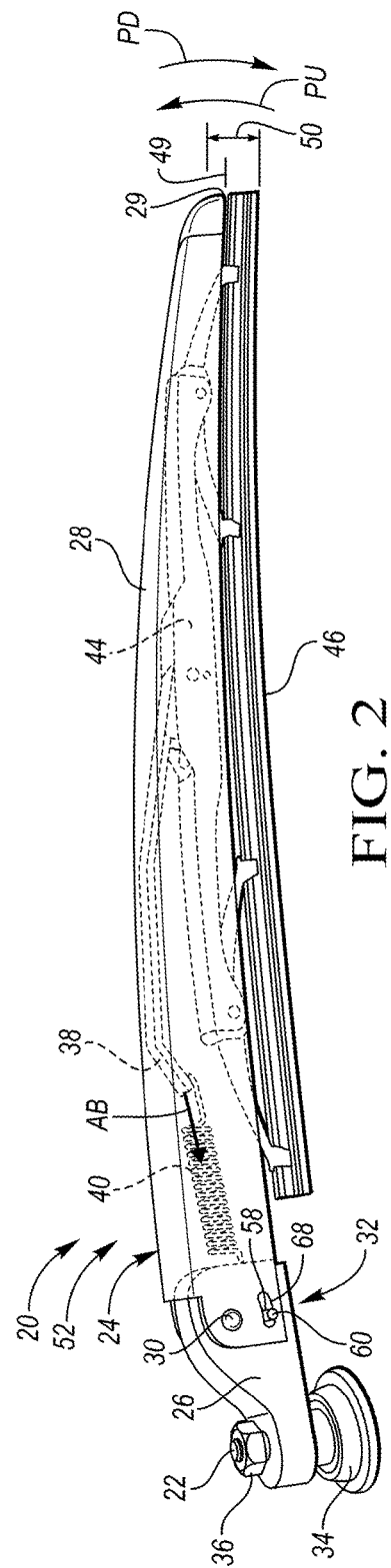
FIG. 2 is a schematic perspective illustration of the wiper system of FIG. 1, showing additional detail.

Referring now to FIGS. 1 and 2, the wiper system 20 includes an actuator or motor shaft 22 and a wiper arm 24 connected to the motor shaft 22. The actuator or motor shaft 22 may be mounted on the window 14, as shown, or may be mounted on the body 12. The wiper arm 24 includes an arm head 26, an arm retainer 28 connected to the arm head 26 via a pivot 30, a wiper blade 46 connected to the arm retainer 28, and a latch 32 for controlling pivoting of the arm retainer 28 with respect to the arm head 26. The arm retainer 28 has an end or tip 29. The actuator or motor shaft 22 moves the wiper arm 24 over the wiped area 18 of the window surface 16 causing the wiper blade 46 to wipe the wiped area 18 of the window surface 16.

Referring now to FIG. 2, the wiper arm 24 arm head 26 may be connected to the motor shaft 22 via an arm nut 36. The motor shaft 22 may include an external spline (not shown) and the arm head 26 may include an internal spline (not shown) at the connection between the motor shaft 22 and the arm head 26. The wiper system may include a grommet 34 to prevent water and other contaminates from entering the vehicle 10 interior adjacent to the motor shaft 22.

The pivot 30, may be a hinge rivet, as shown, or may be any other suitable pivot. The pivot 30 may be connected to the arm retainer 28, as shown, and may be pivotably connected to the arm head 26 via one or more hinge bushings (not shown). Alternatively, the pivot 30 may be connected to the arm head 26 and may be pivotably connected to the arm retainer 28. The pivot 30 allows the arm retainer 28 to pivot relative to the arm head 26 in a pivot up direction (arrow PU) away from the window 14 or in a pivot down direction (arrow PD) toward the window and allows the arm retainer tip 29 to be positioned in a tip position 49.

The wiper arm 24 may include an arm biasing member 40 connected to the arm head 26 and to the arm retainer 28 for applying an arm bias force (arrow AB) to bias the wiper blade 46 toward the window surface 16. The arm biasing member 40 may be a helical coil spring, as shown, or may be any other suitable biasing device. The arm retainer 28 may include an arm piece 38. The arm biasing member 40 may be connected to the arm retainer 28 via the arm piece 38.

The wiper blade 46 may be connected to the arm retainer 28 via a blade carrier 44. The blade carrier 44 cooperates with the arm biasing member 40 and the wiper blade 46 to conform the wiper blade 46 to the window surface 16 as the wiper system 20 moves the wiper arm 24 over the window surface 16. The blade carrier 44 may be connected to the arm retainer 28 via the arm piece 38, as shown.

Referring now to FIGS. 2-4A, the latch 32 is configured to restrict pivoting of the arm retainer 28 with respect to the arm head 26 to an operating range 50 close to the window 14 when the latch 32 is in a latched state 52. The operating range 50 limits pivoting of the arm retainer 26 relative to the arm head 26 in the pivot up direction (arrow PU) and in the pivot down direction (arrow PD) and limits motion of the arm retainer tip 49. The operating range 50 is close to the window 14. The operating range 50 allows the wiper blade 46 to conform to the shape of the window surface 16 as the wiper arm 24 moves the wiper blade 46 over the wiped area 18. The limited range of motion in the pivot up direction (arrow PU) in the operating range 50 prevents an external force (not shown) on the wiper system 20 from lifting the arm retainer 28 and the wiper blade 46 from the window 14 in the pivot up direction (arrow PU). The external force on the wiper system 20 may result from, for example, an automatic car wash. If the arm retainer 28 and the wiper blade 46 are lifted from the window 14 by the external force, the wiper system 20 could possibly be damaged.

Figure 4A:
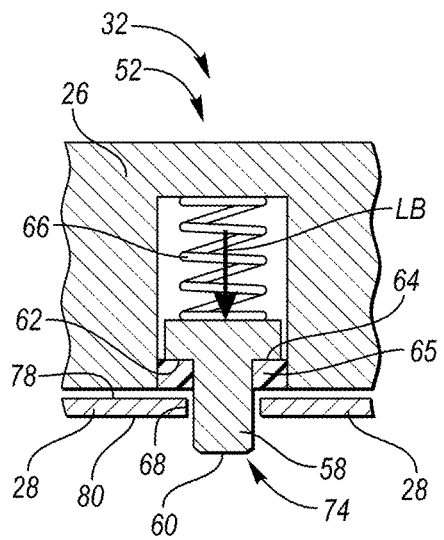
FIG. 4A is a schematic cross-sectional illustration, partially in elevation, of the wiper system of FIG. 3, taken at line 4-4 of FIG. 3 in the latched state.
Figure 4B:
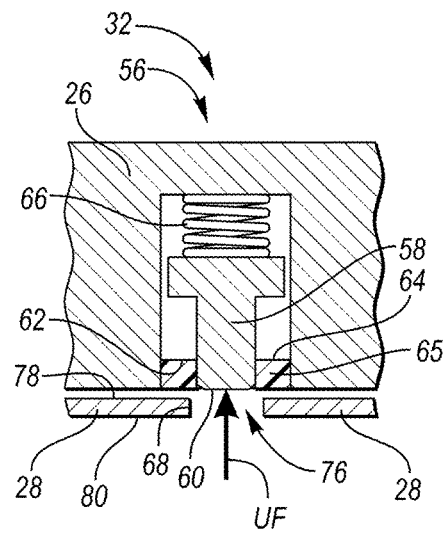
FIG. 4B is a schematic cross-sectional illustration, partially in elevation, of the wiper system of FIG. 3, taken at line 4-4 of FIG. 3 in an unlatched state.
Figure 5:
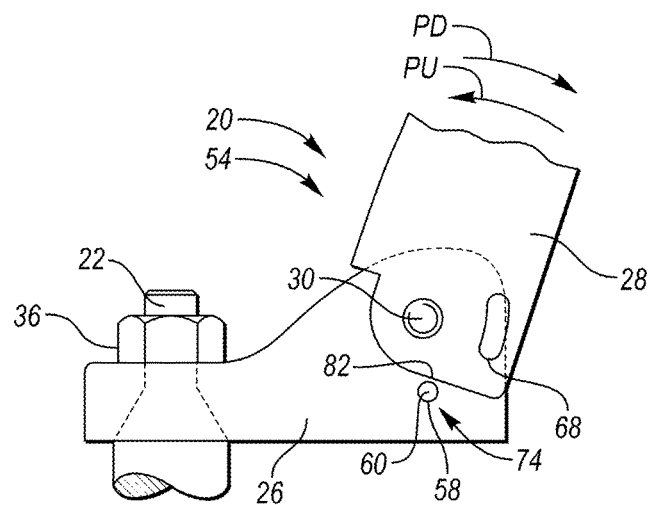
FIG. 5 is a fragmentary schematic side view illustration of the wiper system of FIG. 2, showing the latch allowing pivoting of the arm retainer with respect to the arm head from the operating range to a servicing position away from the window when the latch is in an unlatched state.

The latch 32 is further configured to allow pivoting of the arm retainer 28 with respect to the arm head 26 in the pivot up direction (arrow PU) from the operating range 50 to a service up or servicing position 54, as best seen in FIG. 5, away from the window 14 when the latch 32 is in an unlatched state 56, as best seen in FIG. 4B. The service up or servicing position 54 allows servicing of the wiper system 20, for example changing the wiper blade 46, to be easily performed.

Figure 3:
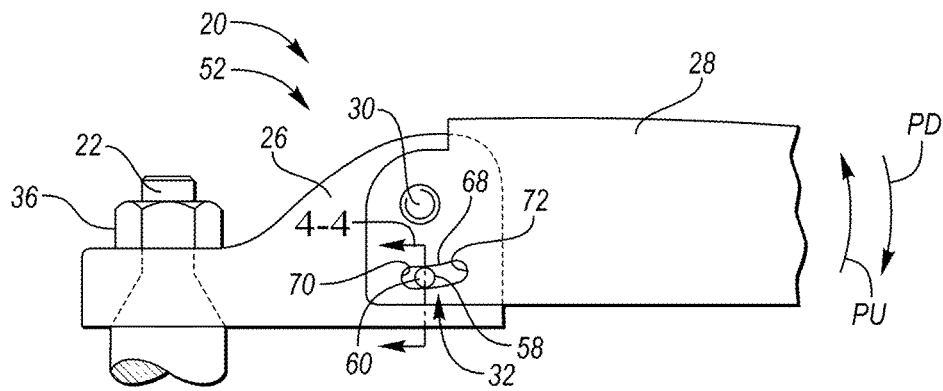
FIG. 3 is a fragmentary schematic side view illustration of the wiper system of FIG. 2 showing the latch restricting the pivoting of the arm retainer with respect to the arm head to an operating range close to the window when the latch is in a latched state.

Referring now to FIGS. 3-4B, the latch 32 may include a latch bar 58 connected to the arm head 26. The arm retainer 28 may be configured with a latch bar receiver feature 68. The latch bar 58 may cooperate with the latch bar receiver feature 68 to restrict pivoting of the arm retainer 28 with respect to the arm head 26 to the operating range 50 close to the window 14 when the latch 32 is in the latched state 52.

The latch bar 58 may be a straight bar or pin with a cylindrical cross section, as shown, or may be any other suitable shape and cross section. The latch bar 58, may be disposed within and extendable from the arm head 26 into the latch bar receiver feature 68 of the arm retainer 28. The latch bar 58 may be moveable from an extended position 74 corresponding to the latched state 52, as best seen in FIG. 4A, of the latch 32 to a depressed position 76 corresponding to the unlatched state 56, as best seen in FIG. 4B, of the latch 32. The latch bar 58 may have an end 60. The end 60 may extend out from the arm head 26 beyond an arm retainer inner surface 78 when the latch bar 58 is in the extended position 74 corresponding to the latched state 52 of the latch 32. Alternatively, the end 60 may extend out from the arm head 26 beyond an arm retainer outer surface 80 when the latch bar 58 is in the extended position 74 corresponding to the latched state 52 of the latch 32. The end 60 may not extend past the arm retainer inner surface 78 when the latch bar 58 is in the depressed position 76 corresponding to the unlatched state 56 of the latch 32.

The latch bar 58 may include a latch bar stop feature 62, which may be a land on the cylindrical pin, as shown, or any other suitable latch bar stop feature. The arm head 26 may include an arm head stop feature 64, which may be part of a bushing 65 press fit into the arm head 26, as shown, or may be any other suitable arm head stop feature. The latch bar stop feature 62 and the arm head stop feature 64 may cooperate to retain the latch bar 58 and to limit extension of the latch bar 58 to the extended position 74.

The latch 32 may include a latch bar biasing member 66 disposed in the arm head 26 for applying a continuous latch bar bias force (arrow LB) to the latch bar 58 to urge the latch bar 58 to the extended position 74 in the latch bar receiver feature 68 to restrict pivoting of the arm retainer 28 with respect to the arm head 26 to the operating range 50 close to the window 14. The latch bar 58 may be moveable from the extended position 74 to the depressed position 76 when an unlatching force (arrow UF) sufficient to overcome the latch bias force (arrow LB) is applied to the latch bar 58 to allow pivoting of the arm retainer 28 with respect to the arm head 26 in the pivot up direction (arrow PU) from the operating range 50 to the servicing position 54. The unlatching force (arrow UF) may be less than about 5 pounds.

The latch bar receiver feature 68 may be an arcuate slot, as shown, formed in the arm retainer 28 and configured to receive the latch bar 58 in the extended position 74. The latch bar receiver feature 68 may be any other suitable feature formed on the arm retainer 28, including but not limited to a round hole, an oval hole, a straight slot, and a square hole. The latch bar receiver feature 68 may include a first edge 70 and a second edge 72 formed in the arm retainer 28. The first edge 70 and the second edge 72 of the latch bar receiver feature 68 may cooperate with the latch bar 58 to restrict pivoting of the arm retainer 28 with respect to the arm head 26 to the operating range 50 close to the window 14 when the latch 32 is in the latched state 52.

Referring now to FIGS. 3-5, the arm retainer 28 may be configured with a service up retaining feature 82, as best seen in FIG. 5. The service up retaining feature 82 may be an edge of the arm retainer, as shown, an opening (not shown) such as a hole or a slot formed in the arm retainer 28, a detent (not shown) formed on the arm retainer inner surface 78, or any other suitable retaining feature. The service up retaining feature 82 may cooperate with the latch bar 68 to restrict pivoting of the arm retainer 28 with respect to the arm head 26 in the pivot down direction (arrow PD) when the arm retainer 28 is in the service up or servicing position 54. The arm retainer 28 may be pivotable with respect to the arm head 26 in the pivot down direction (arrow PD) from the servicing position 54 to the operating range 50 when the latch bar 58 is moved from the extended position 74 to the depressed position 76 by applying the unlatching force (arrow UF) to the latch bar 58.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A wiper system for wiping a window and having an arm head and an arm retainer connected to the arm head via a pivot, the wiper system comprising:
    a latch for controlling pivoting of the arm retainer with respect to the arm head, the latch including:
        a latch bar connected to the arm head; and
        a latch bar receiver feature configured as a hole formed in the arm retainer that receives the latch bar when the latch is in a latched state;
    wherein the latch is configured to restrict pivoting of the arm retainer with respect to the arm head to an operating range close to the window when the latch is in the latched state;
    wherein the latch is further configured to allow pivoting of the arm retainer with respect to the arm head from the operating range to a servicing position away from the window when the latch is in an unlatched state;
    wherein the latch bar cooperates with the latch bar receiver feature to restrict pivoting of the arm retainer with respect to the arm head to the operating range close to the window when the latch is in the latched state;
    wherein the latch bar is a pin disposed within and extendable from the arm head into the latch bar receiver feature of the arm retainer;
    wherein the latch bar is moveable from an extended position to a depressed position; and
    wherein the latch bar receiver feature is an arcuate slot formed in the arm retainer and configured to receive the latch bar in the extended position.

2. The wiper system of claim 1, wherein the latch further includes a latch bar biasing member disposed in the arm head for applying a continuous latch bar bias force to the latch bar to urge the latch bar to the extended position in the latch bar receiver feature to restrict pivoting of the arm retainer with respect to the arm head to the operating range close to the window; and
    wherein the latch bar is moveable from the extended position to the depressed position when an unlatching force sufficient to overcome the latch bar bias force is applied to the latch bar to allow pivoting of the arm retainer with respect to the arm head from the operating range to the servicing position.

3. The wiper system of claim 2, wherein the arm retainer is further configured with a service up retaining feature;
    wherein the service up retaining feature cooperates with the latch bar to restrict pivoting of the arm retainer with respect to the arm head when the arm retainer is in the servicing position; and
    wherein the arm retainer is pivotable with respect to the arm head from the servicing position to the operating range when the latch bar is moved from the extended position to the depressed position by applying the unlatching force to the latch bar.

4. The wiper system of claim 3 wherein the unlatching force is less than about 5 pounds.

5. The wiper system of claim 1, further comprising:
    a blade assembly having a wiper blade and connected to the arm retainer; and
    an arm biasing member connected to the arm head and to the arm retainer for biasing the blade assembly toward the window.

6. A vehicle having a wiper system for wiping a window, the vehicle comprising:
    an arm head;
    an arm retainer connected to the arm head via a pivot;
    a wiper blade connected to the arm retainer;
    an arm biasing member connected to the arm head and to the arm retainer for biasing the wiper blade toward the window; and
    a latch for controlling pivoting of the arm retainer with respect to the arm head, the latch including:
        a latch bar connected to the arm head; and
        a latch bar receiver feature configured as a hole formed in the arm retainer that receives the latch bar when the latch is in a latched state;
    wherein the latch is configured to restrict pivoting of the arm retainer with respect to the arm head to an operating range close to the window when the latch is in the latched state;
    wherein the latch is further configured to allow pivoting of the arm retainer with respect to the arm head from the operating range to a servicing position away from the window when the latch is in an unlatched state;
    wherein the latch bar cooperates with the latch bar receiver feature to restrict pivoting of the arm retainer with respect to the arm head to the operating range close to the window when the latch is in the latched state;
    wherein the latch bar is a pin disposed within and extendable from the arm head into the latch bar receiver feature of the arm retainer;
    wherein the latch bar is moveable from an extended position to a depressed position; and
    wherein the latch bar receiver feature is an arcuate slot formed in the arm retainer and configured to receive the latch bar in the extended position.

7. The vehicle of claim 6, wherein the latch further includes a latch bar biasing member disposed in the arm head for applying a continuous bias force to the latch bar to urge the latch bar to the extended position in the latch bar receiver feature to restrict pivoting of the arm retainer with respect to the arm head to the operating range close to the window; and
    wherein the latch bar is moveable from the extended position to the depressed position when an unlatching force sufficient to overcome the bias force is applied to the latch bar to allow pivoting of the arm retainer with respect to the arm head from the operating range to the servicing position.

8. The vehicle of claim 7, wherein the arm retainer is further configured with a service up retaining feature;
    wherein the service up retaining feature cooperates with the latch bar to restrict pivoting of the arm retainer with respect to the arm head when the arm retainer is in the servicing position; and wherein the arm retainer is pivotable with respect to the arm head from the servicing position to the operating range when the latch bar is moved from the extended position to the depressed position by applying the unlatching force to the latch bar.

9. The vehicle of claim 8, wherein the unlatching force is less than about 5 pounds.

\* \* \* \* \*